Oct. 25, 1938.                H. J. CRINER                2,134,105
                          BREAD SLICING MACHINE
                         Filed May 24, 1937         2 Sheets-Sheet 2
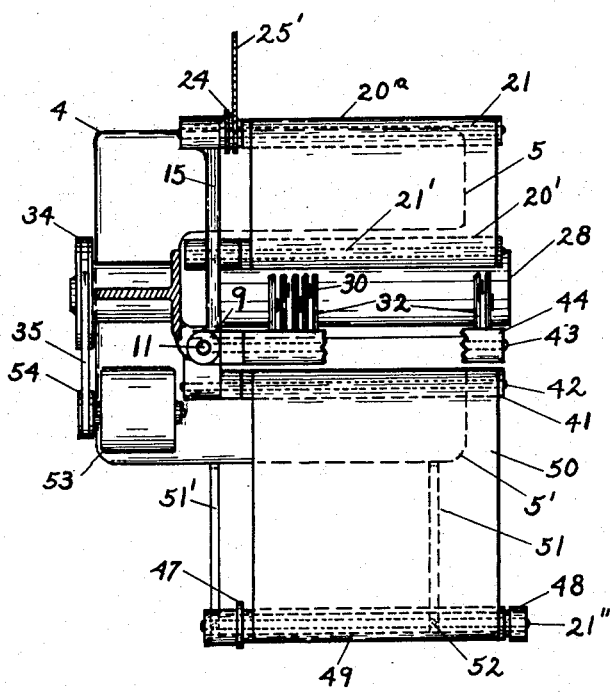
Fig-5
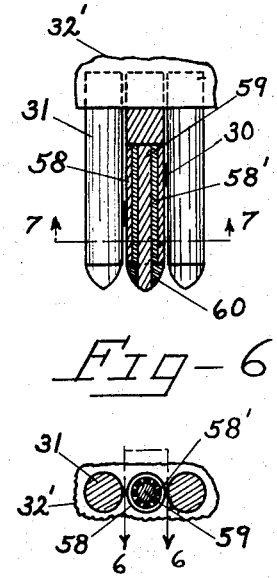
Fig-6
Fig-7
INVENTOR.
Harry J. Criner
BY Bush & Bush,
ATTORNEYS Patented Oct. 25, 1938

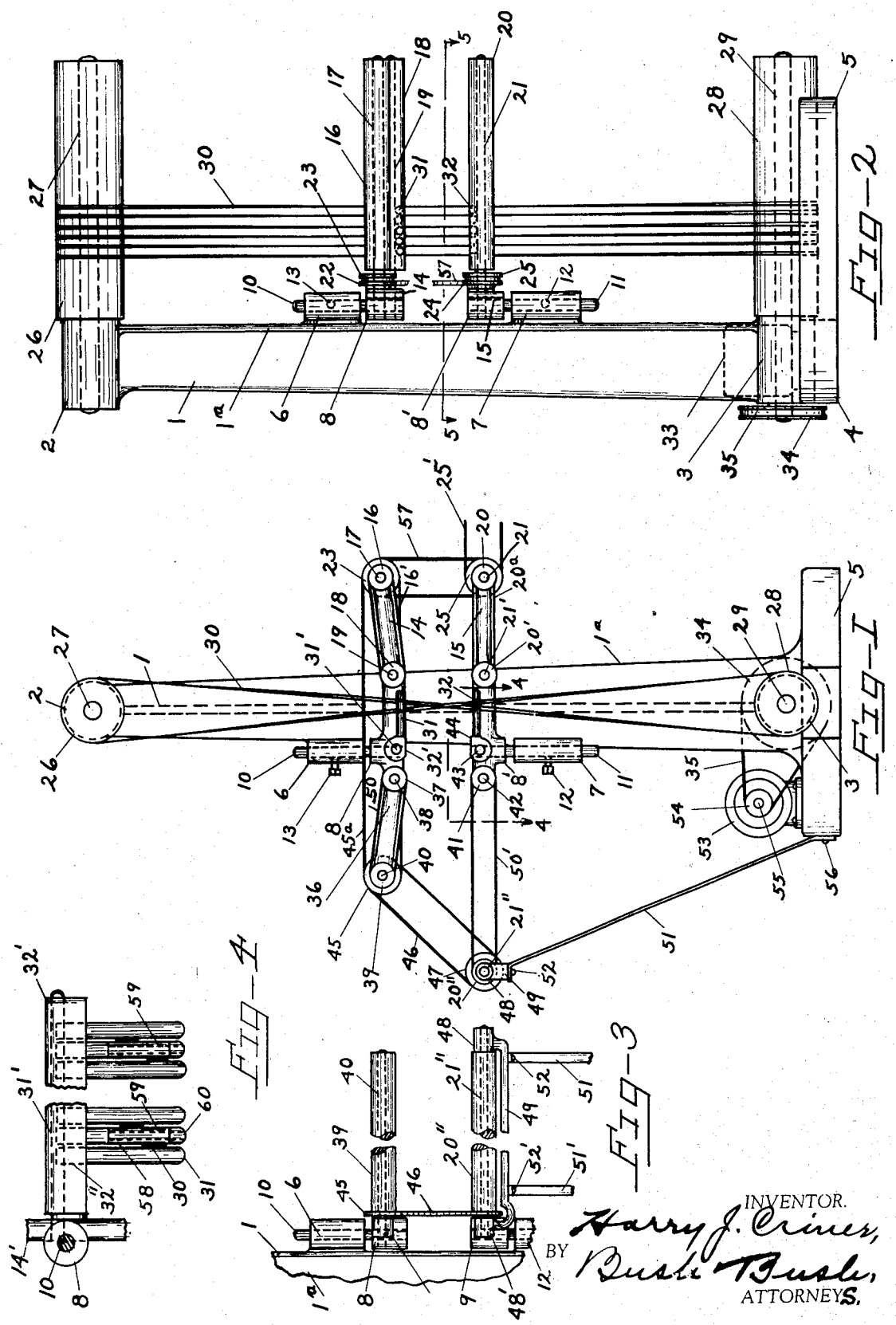

2,134,105

UNITED STATES PATENT OFFICE 2,134,105

BREAD SLICING MACHINE

Harry J. Criner, Davenport, Iowa, assignor of one-half to A. G. Bush, Davenport, Iowa Application May 24, 1937, Serial No. 144,351

9 Claims. (Cl. 146—88)

My invention relates to improvements in bread slicing machines of the band-blade type.

The objects of my invention are to provide simple, improved, adjustable and unitary means for simultaneously feeding the bread to the cutting blades and for guiding the bread and maintaining it at the proper level for slicing it to the best advantage; also to provide a simple, easily adjustable unit for feeding the bread to the blades, guiding the bread while being sliced and for guiding the blades during the slicing portion of their travel.

I attain these objects by the means illustrated in the accompanying drawings, in which,—

Figure 1 is a side elevation of my apparatus from the right of Figure 2;

Figure 2 is an end elevation showing the discharge end of the apparatus;

Figure 3 is a detail showing an end elevation of a portion of the feed end of the machine;

Figure 4 is an enlarged detail showing a plan view of the crossbar carrying the guide fingers:

Figure 5 is a detail plan view of the lower feed and discharge belts or aprons, and the lower guide assembly showing the frame of the machine, in section on the line 5—5 of Figure 2;

Figure 6 is an enlarged detail showing an alternate form of guide in which needle bearings are utilized;

Figure 7 is an enlarged sectional detail on the line 7—7 of Figure 6.

Similar numerals refer to similar parts throughout the several views.

My machine comprises a base, 4, with extended feet, 5, formed integral therewith and with a vertical column, 1, preferably T-shaped in section, suitably united thereto. The column, 1, has a main bearing boss, 3, formed integral therewith in which a horizontal shaft, 29, is mounted, which extends the full width of the machine, and one end of which projects outside of the column, 1, and carries a drive pulley, 34, thereon, which may be driven by a belt, 35, actuated by a drive pulley, 54, mounted upon the shaft, 55, of a motor, 53, which may be united to the base, 4, by any suitable means.

Upon the shaft, 29, is mounted a cylindrical pulley, 28, which may be of any of the forms well-known and in common use. Upon the upper end of the column, 1, I form a boss, 2, which has mounted therein a shaft, 27, which carries a pulley, 26, revolvably mounted thereon corresponding to the pulley, 28, and, over the pulleys, 26 and 28, a plurality of cutting band-blades, 30, are mounted in substantially figure 8 form.

In order to guide the blades, I mount upper and lower guide assemblies equally spaced above and below the crossing point of the blades. These guide assemblies comprise crossbars, 32', and 44, which are slidingly mounted upon shafts, 31' and 43, respectively, and may be secured in place by set screws or other suitable means.

Extending to the rear from the crossbars, 32', and 44, are pluralities of fingers, 31 and 32. These fingers are fitted in the crossbars by a press-fit or other suitable means, and may be plain steel pins hardened to a glass hardness, or alternate pins, as shown in Figure 4, may be provided with rolls, 58, interposed between the portions of a given cutting blade traveling in opposite directions, so as to give a rolling cantact with the blade. If desired, these rolls may be provided with needle bearings as shown in Figures 6 and 7, in which a plurality of needles or small rods, 58', are spaced about a pivot pin, 59, about which they may revolve. A cap, 60, may be pressed upon the end of the pivot, 59, to secure the needles in place. If desired, all of the fingers, 31 and 32, may be provided with similar rolls.

The shafts, 31' and 43, have their inner ends mounted in brackets, 8 and 8'. These brackets are suitably united to vertical stub-shafts, 10 and 11, which are slidingly mounted in bosses, 6 and 7, formed integral with or suitably united to the column, 1. Set screws, 13 and 12, are mounted in the bosses, 6 and 7, and are adapted to lock the shafts, 10 and 11, in fixed vertical and angular positions.

The bracket, 8, has suitably mounted therein a shaft, 38, which carries a feed belt pulley, 37, revolvably mounted thereon, which supports and carries the inner end of the feed belt, 50.

The outer end of the feed belt, 50, passes over a pulley, 39, revolvably mounted upon a shaft, 40, which is rigidly mounted in the outer end of an arm, 36, the inner end of which is pivoted to the bracket or casting, 8, by the shaft, 38.

The bracket, 8', has united thereto a shaft, 42, which carries the feed belt pulley, 41, revolvably mounted thereon over which the inner end of the feed belt, 50', passes.

The outer end of the lower feed belt, 50', passes over a pulley, 20'', revolvably mounted upon the shaft, 21''. This shaft is secured in suitable bearings, 48 and 48', mounted upon or formed integral with a bracket, 49, which in turn may be supported by diagonal brace-rods, 51 and 51', the upper ends of which may be bolted to the bracket, 49, by bolts, 52 and 52', and the lower ends of which may be secured to the base by bolts, 56, or to any other suitable point of attachment.

The fingers, 31 and 32, extend toward the rear of the machine as shown in Figure 1, so as to contact the cutting blades, 30.

A discharge conveyor comprises a lower conveyor belt, 20a, which is carried by and passes over pulleys, 20 and 20', revolvably mounted upon shafts, 21 and 21'. The inner ends of the shafts, 21 and 21', are rigidly mounted in the ends of the arm or casting, 15, the inner end of which is united to the casting or bracket, 8'. An arm, 14, has one end pivotally united to the rear end of the bracket, 8, upon the shaft, 19, and carries a shaft, 17. Cylindrical pulleys, 16 and 18, are revolvably mounted upon the shafts, 17 and 19, and carry a conveyor belt, 16'.

The arm, 15, and the bracket 8', are preferably united in a straight, horizontal line, while the outer ends of the arms, 14 and 36, are preferably inclined upwardly from the bracket, 8.

A drive belt, 57, passing over suitable pulleys upon the shafts, 17 and 21, is utilized to drive the discharge conveyor belts simultaneously and a drive belt, 45a, passing over suitable pulleys on the shafts, 17 and 40, transmits power from the discharge driving apparatus to the feed driving apparatus. A drive belt, 46, passing over suitable pulleys mounted upon the shafts, 40 and 21', is used to drive the feed belt, 51'.

A drive belt, 25', passing over a pulley, 25, upon the shaft, 21, may be utilized as a source of power to drive the entire feed and discharge assemblies.

In the operation of my machine, the machine is first set up with the cutting blades, 30, mounted upon the pulleys, 26 and 28, in figure 8 form. When the pulleys, 26 and 28, are of the same size, the crossing point of the blades will be midway between the shafts, 27 and 29, but when desired for any reason to use a larger pulley upon one of the shafts, the crossing point will be varied accordingly.

In the slicing of bread by band-blade machines where the blades are crossed, it is very important to have the loaves held at a point where the middle of the loaf is on a level with the crossing point of the cutting blades or at such a height that the descending and ascending portions of the blades will contact a given loaf of bread at the same instant so that the upward pull will be equalized by the downward pull upon the loaf.

Accordingly, the height of the lower feed assembly and of the upper feed assembly, which also acts as a guide or detent for the bread, will be adjusted to correspond to the height of the loaves to be sliced and so that the middle of the loaves as they travel forward, will be on a level with the crossing point of the blades.

The upper guide and conveyor assembly, as shown, can act, if necessary, to slightly compress a loaf vertically in case any given loaf is a little higher than the regular run of loaves being cut and the form of the discharge guide assembly will permit the loaf to spring back and assume its natural shape as it leaves the discharge conveyor.

The upper feed and discharge conveyors are inclined upwardly away from the cutting blades and this form of construction will permit the belt or chain, 45a, to secure the outer ends of the arms, 14 and 36, in their upwardly inclined positions without other support.

The belts, 45a, 46, 50' and 57, are made with a sufficient degree of elasticity to permit necessary movement of the conveyor assemblies in adjusting the heights thereof for different sized loaves of bread and if greater adjustments are required than the elasticity of these belts permits, belts, 46 and 57, may be replaced by longer or shorter belts as required to meet the requirements of each particular case.

Sprocket chains may be substituted for the belts, 45a, 46, 50' and 57, or any of them, when and as desired, and sprocket wheels substituted for the pulleys.

I claim:

1. In a band-blade bread slicing machine the combination with a frame, of spaced cylindrical pulleys revolvably mounted upon the frame, a plurality of endless band-blades mounted upon the pulleys in figure 8 form, a pair of feed belts adjustably mounted upon the frame spaced to contact respectively the lower and upper surfaces of the loaves of bread as they advance to cutting position and to carry the bread forward with the middle of the respective loaves at the level of the crossing points of the blades, upper and lower guide assemblies for the blades corresponding in height to the feed belts and each comprising a transverse bar having a plurality of spaced fingers united thereto to space and guide the blades at equal distances above and below their crossing point, and unitary means to respectively adjust uniformly the height of each guide assembly and its corresponding feed belt simultaneously.

2. A band-blade slicing machine comprising a frame, spaced cylindrical pulleys mounted upon the frame, a plurality of endless band-blades mounted upon the pulleys in figure 8 position, upper and lower supporting brackets slidingly mounted upon the frame, set screws threaded into the frame for securing the brackets in adjusted vertical position, guide bars united to the brackets extending transversely of the machine parallel to the series of blades, hardened fingers mounted upon the guide bars extending rearwardly between the blades and to contact space and guide the blades while slicing and to simultaneously guide the bread to and across the blades, feed and discharge conveyor shafts rigidly secured in the supporting brackets with conveyor pulleys revolvably mounted thereon to support spaced feed and discharge conveyor belts carried by said pulleys, and means for driving the blades and the conveyor belts.

3. In a bread slicing machine of the multiple, crossed band-blade type, the combination with a frame and a plurality of blades operatively mounted thereon, of a supporting bracket slidingly mounted upon the frame, a set screw threaded in the frame for securing the bracket in adjusted vertical position, a guide bar united to the bracket extending transversely of the machine parallel to the series of blades, hardened fingers mounted upon the guide bar extending rearwardly between the blades and adapted to guide the blades during their travel, and to contact and guide the bread across the blades, a pair of conveyor shafts rigidly secured in the supporting bracket with conveyor pulleys revolvably mounted thereon, a conveyor belt carried by said pulleys, to carry the bread to the blades, means for driving the blades and the conveyor belt.

4. In a bread slicing machine of the multiple, crossed band-blade type, a frame, a supporting bracket slidingly mounted upon the frame, set screws for securing the bracket in adjusted vertical position, a guide bar united to the bracket extending transversely of the machine parallel to the series of blades, hardened fingers mounted upon the guide bar extending rearwardly between the blades and to guide the blades and the bread while undergoing slicing, feed conveyor shafts rigidly secured in the supporting bracket with conveyor pulleys revolvably mounted thereon, a feed conveyor belt carried by the pulleys, a pair of parallel discharge conveyor shafts rigidly mounted in the supporting bracket having pulleys revolvably mounted thereon with a discharge conveyor belt carried thereby, and means for driving the blades and the conveyor belts simultaneously.

5. In a bread slicing machine of the multiple, crossed band-blade type, the combination with a frame and a plurality of blades operatively mounted thereon, of upper and lower vertically adjustable supports slidingly mounted upon the frame, set screws to secure them in fixed position thereon, upper and lower feed and discharge conveyors and upper and lower guide assemblies having fingers to contact space and guide the blades while slicing united to and carried by the said upper and lower supports respectively, and means for separately adjusting and fixing the relative positions of said supports upon the frame at points equi-distant from the the crossing points of the blades.

6. In a bread slicing machine of the multiple, crossed band-blade type, the combination with a frame and a plurality of blades operatively mounted thereon, of upper and lower vertically adjustable supports mounted upon the frame, upper and lower feed and discharge conveyors and upper and lower guide assemblies each comprising a transverse bar having a plurality of hardened fingers extending rearwardly between and past the blades and the alternate fingers being provided with needle bearing rolls, adapted to space and guide the blades while slicing united to and carried by the said upper and lower supports respectively, and means for separately adjusting and fixing the relative positions of said supports upon the frame.

7. In a bread slicing machine of the multiple, crossed band-blade type, the combination with a frame and a plurality of blades operatively mounted thereon, of a blade guide comprising a crossbar having a plurality of projecting fingers secured thereon comprising needle bearings and hardened rolls rotatably mounted on the bearings to space and guide the cutting blades.

8. In a bread slicing machine of the multiple, band-blade type, the combination with a frame and a plurality of blades operatively mounted thereon, of a blade guide comprising a crossbar having a plurality of projecting fingers secured thereon each comprising a needle bearing and a hardened roll rotatably mounted thereon to space and guide the cutting blades.

9. In a bread slicing machine of the multiple, crossed band-blade type, the combination with a frame and a plurality of blades operatively mounted thereon, of upper and lower vertically adjustable supports mounted upon the frame, upper and lower feed and discharge conveyors and upper and lower guide assemblies each comprising a transverse bar having a plurality of hardened fingers extending rearwardly between and past the blades and each of said fingers being provided with needle bearing rolls, adapted to space and guide the blades while slicing, united to and carried by the said upper and lower supports respectively, and means for separately adjusting and fixing the relative positions of said supports upon the frame.

HARRY J. CRINER.